United States Patent [19]

Hunter

[11] Patent Number: 4,896,542
[45] Date of Patent: Jan. 30, 1990

[54] PORTABLE WASTEWATER FLOW METER

[76] Inventor: Robert M. Hunter, 320 S. Wilson Ave., Bozeman, Mont. 59715

[21] Appl. No.: 286,695

[22] Filed: Dec. 20, 1988

Related U.S. Application Data

[63] Continuation-in-part of Ser. No. 51,325, May 19, 1987, Pat. No. 4,799,388.

[51] Int. Cl.$^4$ .............................................. G01F 1/44
[52] U.S. Cl. .................................... 73/861.63; 73/215
[58] Field of Search ..................... 73/215, 216, 861.63, 73/861.64

[56] References Cited

U.S. PATENT DOCUMENTS 3,427,878  2/1969  Gerlitz .................................. 73/215
4,095,466  6/1976  Schontzler ........................... 73/215

FOREIGN PATENT DOCUMENTS 1260808  2/1968  Fed. Rep. of Germany ........ 73/215

Primary Examiner—Herbert Goldstein

[57] ABSTRACT

A portable wastewater flow meter particularly adapted for temporary use at a single location in measuring the rate of liquid flow in a circular entrance conduit of a sewer manhole both under free flow and submerged, open channel conditions and under full pipe, surcharged conditions, comprising an apparatus having a cylindrical external surface and an inner surface that constricts the flow through the apparatus in such a manner that a relationship exists between (1) the difference between the static pressure head of liquid flowing through the entrance of the apparatus and the static pressure head of liquid flowing through the constriction, and (2) the rate of liquid flow through the apparatus.

6 Claims, 8 Drawing Sheets

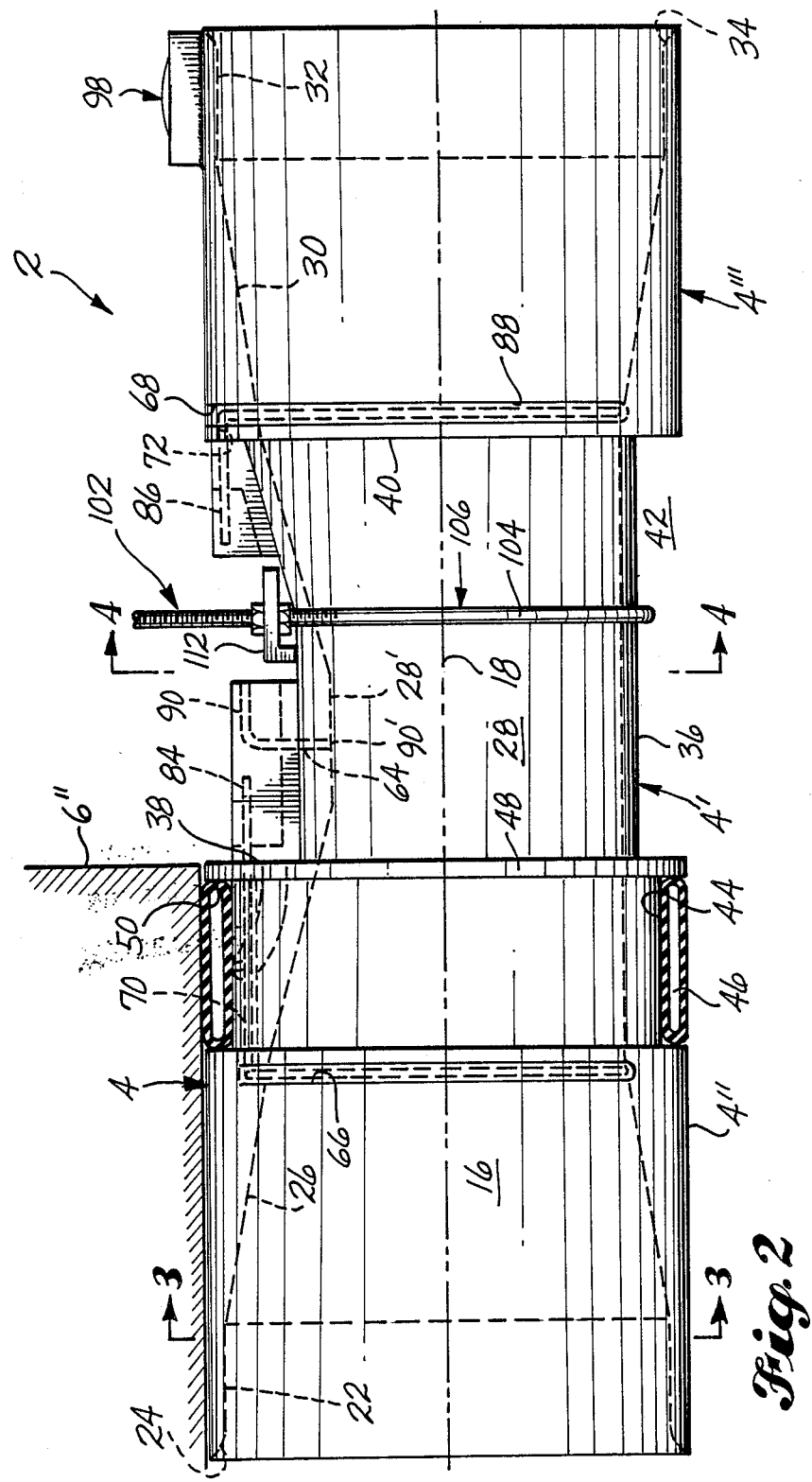

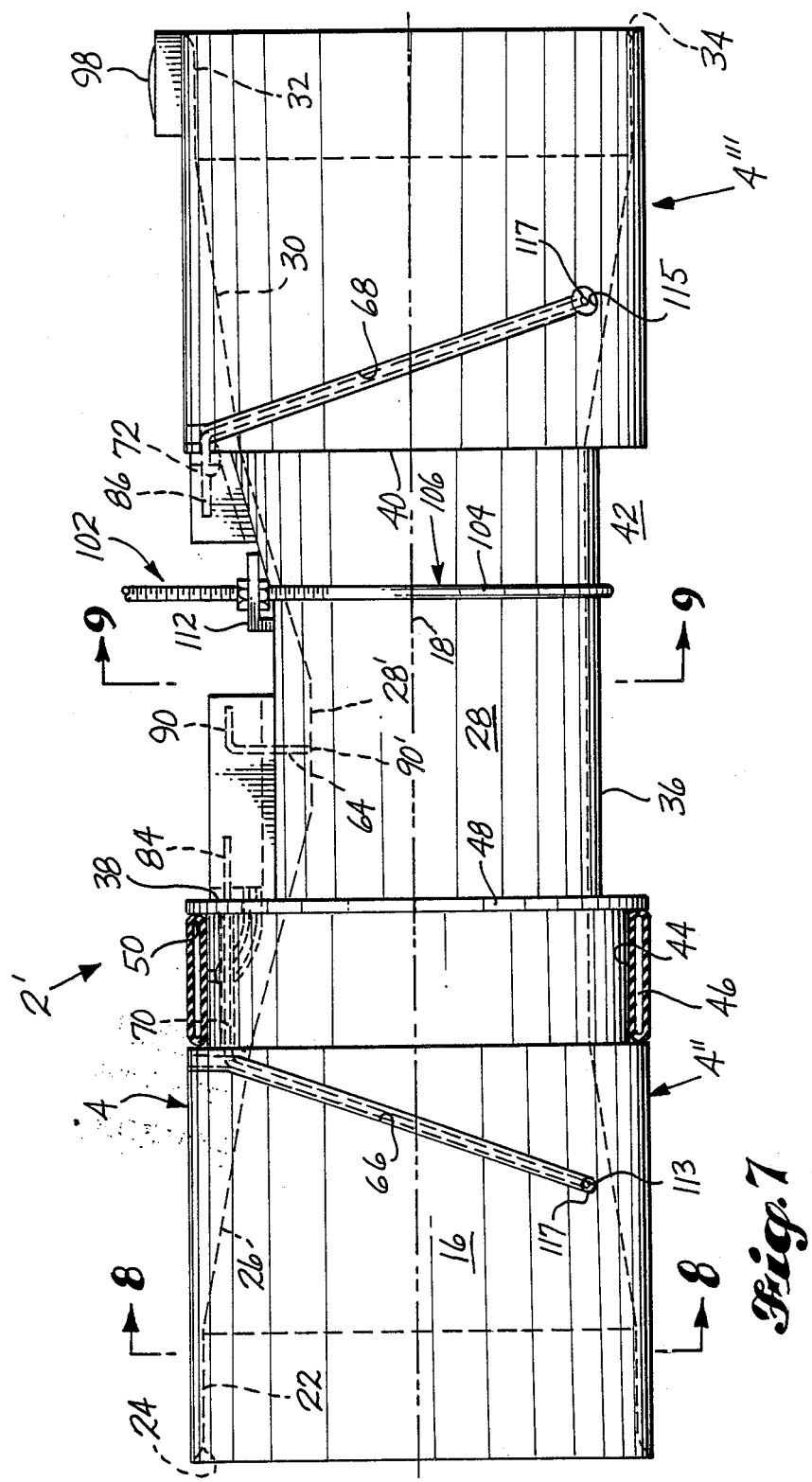

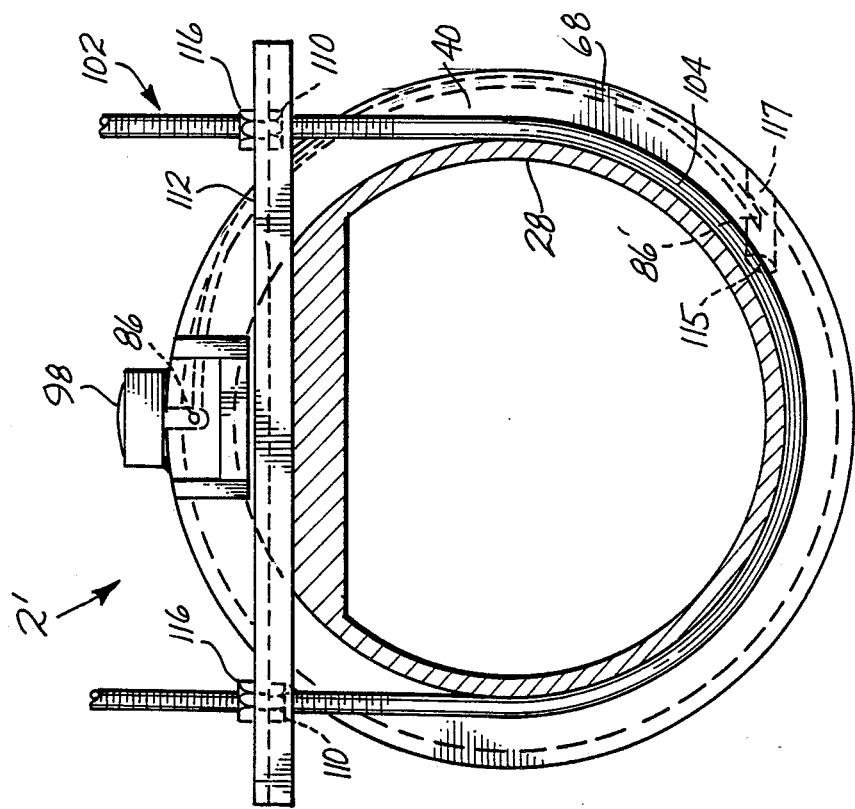
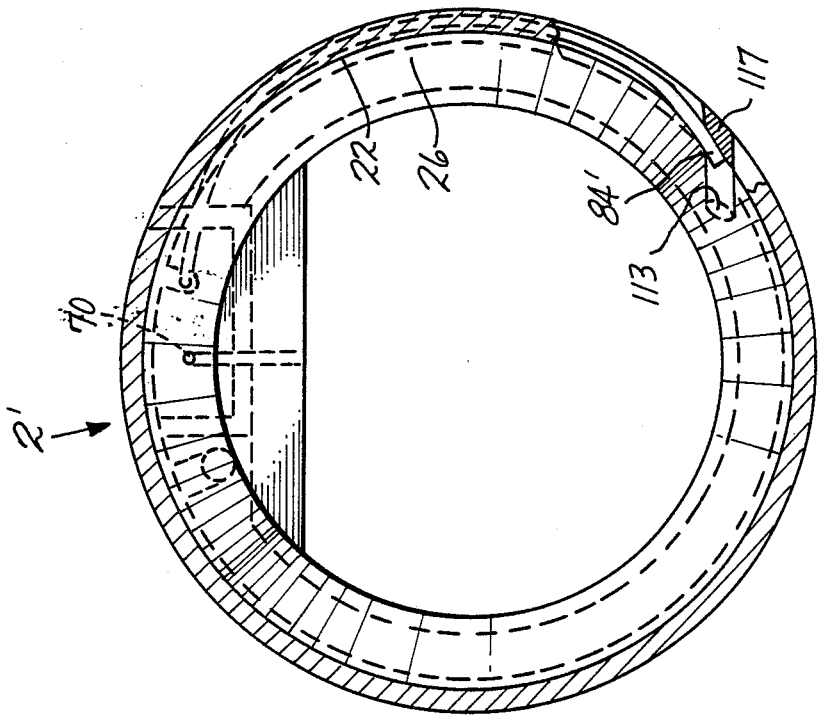

PORTABLE WASTEWATER FLOW METER

This application discloses improvements that were discovered during research funded by the U.S. Department of Energy under the Energy-Related Inventions Program. The invention is described in detail in a report entitled "The Flumeter TM: A New Tool for Wastewater Management" prepared for the U.S. Department of Energy by Yellowstone Environmental Science, Bozeman, Mont., May 1988.

This application is a continuation-in-part of U.S. Pat. Application No. 051,325 filed May 19, 1987 now U.S. Pat. No. 4,799,388.

TECHNICAL FIELD

This invention relates to a metering device for use in fluid flow metering applications and more particularly to such a metering device for placement in the entrance conduit of a sewer manhole.

BACKGROUND ART

Millions of dollars are expended annually by communities attempting to isolate and eliminate storm water inflows to their sanitary sewer systems. For many years, the engineering profession has recognized that accurate, temporary measurement of wastewater flows emanating from subareas within a total sewer system is the most cost-effective means of determining the portions of the system with the most serious inflow problems.

Sewers that carry wastewater from areas that experience severe storm water inflow problems typically operate under surcharged conditions during and immediately after rainfall events. Unfortunately, it is under these conditions that accurate flow rate data are almost impossible to obtain. For a variety of reasons, it is normally impractical to use a primary flow metering device, such as a weir or flume, that would allow depths of flow to be converted into flow rates. Weirs are subject to upstream sedimentation and fouling by debris; they must be fabricated to suit the physical configuration of each particular manhole, and are difficult to calibrate under surcharged conditions. Flumes, such as the Palmer Bowlus flume and other venturi flumes, are typically inaccurate at upstream depths of flow that exceed 75 percent of the sewer diameter and are useless under surcharged conditions. An alternative is to measure the head loss (usually fractions of an inch) between two manholes and to use culvert formulas and the Manning formula to grossly estimate flow rates. Of course, this method requires that depth of flow measurements be made in two manholes instead of one, thus doubling the cost of flow measurement.

Great advances have been made in the last decade in the design of equipment for measuring, recording, and storing depth of liquid flow (or pressure) information. No one, however, has developed a portable primary wastewater flow metering device that would allow depths of flow or pressure head to be accurately converted into flow rates under both free flow and submerged flow, open channel conditions and under full pipe, surcharged conditions.

DISCLOSURE OF THE INVENTION

The invention is concerned with the novel construction of the device which enables it to meter both forward and reverse flow in sewers of circular cross section under both free flow and submerged, open channel conditions and under full pipe, surcharged conditions wherein the surface elevation of the liquid in the manhole may be far above the crest of the sewer in which the device is installed. In general, the invention disclosed herein is for temporary installation in a sewer as it enters a sewer manhole. The outer surface of the invention is generally cylindrical to allow its placement in the entrance pipe. An inflatable collar encircles the cylindrical outer surface of the apparatus so that when the apparatus is placed in the inlet pipe and the inflatable collar is inflated, a seal is provided there between so that the entire flow in the sewer passes through the apparatus.

The interior surface of the apparatus is so shaped as to cause there to be a relationship between the depth of flow (static pressure head) at the upstream entrance section of the apparatus and the flow rate through the apparatus under free flow, open channel conditions when the sewer pipe is flowing partially full. When the apparatus is operating in a submerged mode (above its modular limit), this condition is sensed by comparing the upstream and downstream pressure heads and a correction factor is applied to the flow rate calculated using a free flow calibration curve. Furthermore, the interior surface of the apparatus is so shaped as to cause there to be a relationship between the difference between the static pressure head at the invert of the upstream entrance section of the apparatus and the static pressure head at the crest of the constricted throat section of the apparatus under surcharged conditions when the pipe in which the apparatus is installed is flowing full. Flow data are obtained by conventional means utilizing the relationships between static pressure heads and flow rate.

The device is an improvement over prior art in that floatable solids can be conveyed through the device under free flow conditions, and in that much greater accuracy in liquid flow measurement is possible. The device is also an improvement over prior art in that accurate flow metering is possible at one location in situations in which the manhole in which the device is installed is surcharged above the crest of the sewer in which the device is installed. The device is an improvement over prior art in that the flow constricting surfaces of the device are not permanently affixed to the walls of the pipe, in that a compact configuration is proposed, and in that either piezoelectric pressure transducers or a bubbler-type pressure sensing mechanism can be used to sense static pressure heads.

In general, it is an object of the present invention to provide an apparatus for metering forward and reverse flow in a sewer that can operate under both free flow and submerged flow, open channel conditions when the sewer is flowing at less than full depth and under surcharged conditions when the sewer is flowing full and the metering manhole is surcharged. It is another object of the present invention to provide a portable flow metering apparatus for quick installation in a sewer adjacent to a manhole. It is another object of the present invention to allow floatable sewage solids to be conveyed through the device when it operates under free flow and submerged, open channel conditions. It is another object of the present invention to provide a flow metering apparatus requiring a relatively small head loss in creating the static pressure head differences used to calculate flow rates.

For the purposes of this patent, the term tubular venturi metering device means an apparatus that fulfills the function of a modified venturi flume when the sewer in which the invention is installed is flowing less than full and the function of a venturi tube when the sewer in which the invention is installed is flowing full. The term tubular venturi metering device also means an apparatus wherein the constriction is configured so as (1) to cause the device to maintain its metering function even at low liquid flow rates and (2) to cause the constriction to fill with liquid at approximately the same flow rate that the upstream pipe fills with liquid and thereby maintain its metering function during the transition from open channel to full pipe flow.

It is well known in the art that a modified venturi flume is a constriction in an open channel, so proportioned as to produce flow at critical depth in the open channel in the vicinity of the constriction and that a relationship exists between the depth of flow in the open channel upstream from the constriction and the rate of liquid flow. Examples of modified venturi flumes include the Palmer Bowlus flume and the cutthroat flume. It is also well known in the art that a venturi tube is a constriction in a closed pipe, so proportioned as to accelerate the fluid flowing in the pipe and lower its static pressure head in such a manner that a relationship exists between (1) the difference between the static pressure head of liquid flowing in the pipe upstream of the venturi tube and the static pressure head of liquid flowing through the constriction, and (2) the rate of liquid flow.

Additional objects and features of the invention will appear from the following description in which the preferred embodiment has been set forth in detail in conjunction with the accompanying drawings.

BRIEF DESCRIPTION OF THE DRAWINGS

These features will be better understood by reference to the accompanying drawings which illustrate presently preferred embodiments of the invention that includes a portable tubular venturi metering device adapted to be installed in a cylindrical sewer pipe to meter the flow in the pipe at a manhole therein.

In the drawings:

FIG. 2 is a longitudinal view of an embodiment of the device installed in a pipe, said pipe shown in partial cross-section, said embodiment having entrance section and exit section bubbler tubes that discharge into liquid in the annular space between the outer surface of the device and the inner surface of the pipe.

FIG. 7 is a longitudinal view of an embodiment of the device with upstream and downstream bubbler tubes that discharge into liquid flowing through the entrance and exit sections of the device.

FIG. 8 is a cross-sectional view of the device taken at section 8 shown on FIG. 7.

FIG. 9 is a cross-sectional view of the device taken at section 9 shown on FIG. 7.

BEST MODE FOR CARRYING OUT THE INVENTION

Figure 1:
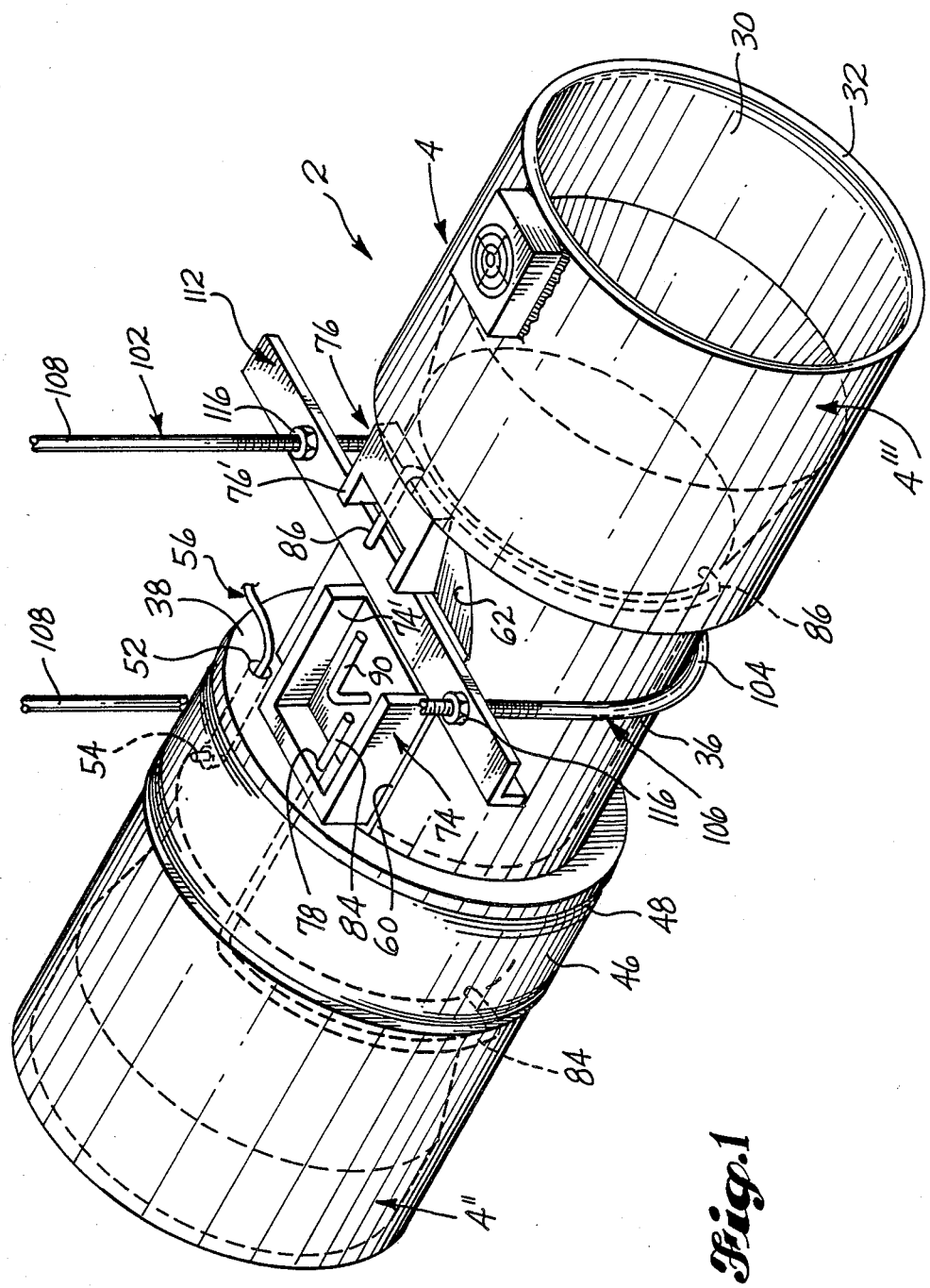
FIG. 1 is a perspective view of an embodiment of the device.
Figure 4:
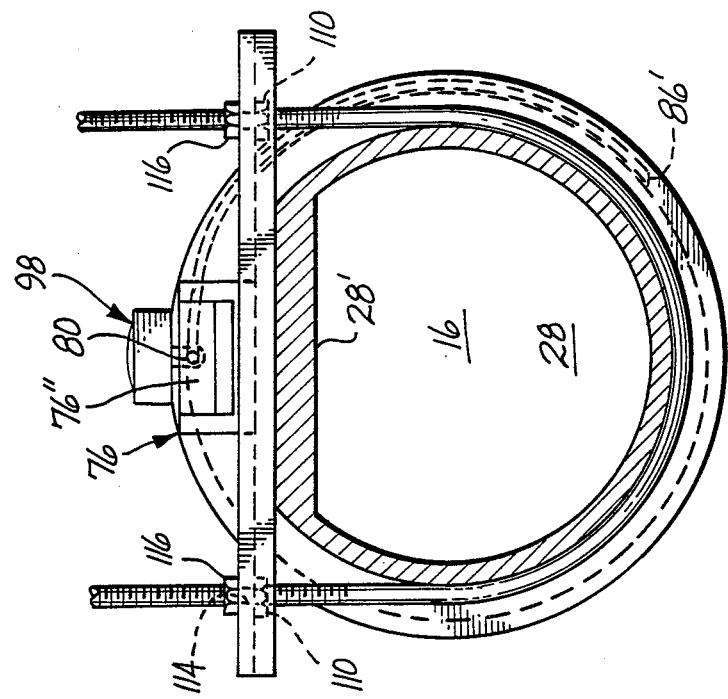
FIG. 4 is a cross sectional view of the device taken at section 4 shown on FIG. 2.
Figure 3:
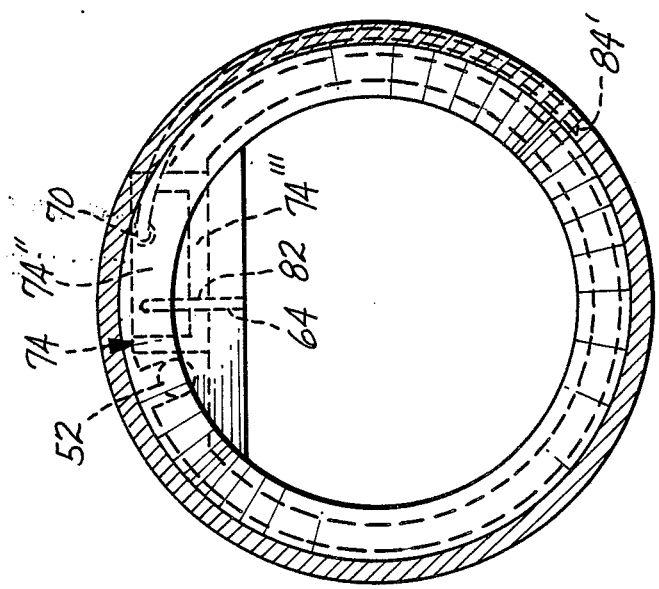
FIG. 3 is a cross-sectional view of the device taken at section 3 shown on FIG. 2.

Referring to the drawings, it will be seen that the portable metering device 2 has a elongated, cylindrical body 4, and is adapted to be lowered into a manhole 6, and then inserted while horizontal into the bottom of the upstream section 8 of a sewer pipe 10 traversing the bottom of the manhole. The manhole 6 upstands from the pipe 10 in sealed engagement with the same about a part-cylindrical opening 12 in the top of the pipe which extends for substantially the width of the manhole. Meanwhile, the remainder 14 of the pipe 10 transverses a portion of the bottom of the manhole. At a point on the opposite side of the manhole the pipe resumes full circumference and exits from the manhole.

The body 4 of the device 2 is tubular and has a venturi cross-section longitudinally thereof. That is, the device 2 has an open-ended bore 16 through the same, the longitudinal axis 18 of which coincides with that of the device itself, so that when the device is installed in the pipe, the axis 18 of the bore 16 is substantially parallel to the axis 29 of the pipe, however, the device is leveled in the pipe. The bore itself has a cylindrical vestibule 22 at that end 24 of the device which is oriented upstream of the liquid flow in the pipe, and downstream therefrom, the vestibule opens into a conically axially inwardly tapered entrance section 26 which converges toward the axis 18 of the bore in the downstream axial direction thereof. The entrance section 26 terminates short of the axis of the bore, however, and opens into a throat 28 which interconnects it in turn with an exit section 30 that diverges from the axis 18 of the bore so as to have a conically axially outwardly tapered configuration. The exit section 30 is followed in turn by a cylindrical outlet 32 which is disposed at that end 34 of the device that is oriented downstream of the liquid flow in the pipe. Both the outlet 32 and the vestibule 22 have rounded rims at the respective ends 24, 34 thereof, to facilitate liquid flow through the bore; and the cross-sectional area of the throat 28 is configured, relative to the of the pipe 10, transverse the respective axes 18, 29 thereof, so that the throat will fill with liquid substantially simultaneously with the upstream section 8 of the pipe when the liquid depth rises therein, as was explained earlier in the aforementioned co-pending Application.

The body 4 of the device 2 is generally cylindrical, as indicated, but the center section 4' of the same, axially of the cylinder, is reduced in diameter so that the device has a neck 36 midway thereof, and axially opposing shoulders 38 and 40 on the relatively upstream and downstream end portions 4" and 4''' thereof, adjacent the neck. The shoulders and neck, in turn, define an annulus 42 for accommodating certain additional components of the device, as shall be explained; and in addition, the relatively upstream end portion 4" has an additional reduced diameter neck 44 thereon for accommodating a toroidal collar 46 used in forming a liquid seal between the device and the pipe, at the outer periphery of the device when it is installed in the upstream section 8 of the pipe, as shall be explained. The latter neck 44 is larger in diameter than that, 36, at the center section 4', and is separated from the center neck 36 by a circumferential flange 48 having substantially the full diameter of the body 4 of the device. The collar 46 is nevertheless accomodatable within the annulus 50 about the larger neck 44, and there is a hole 52 in the annular surface of the neck 44 to accomodate the valve stem 54 of the collar 46 when it is circumsposed about the neck 44. The hole 52 opens in turn into the annulus 42 of the center neck 36 to that a compressed gas source 56 can be connected with the stem 54, as seen in FIG. 1. This source commonly includes a tube 100 which is mated with the valve 54 and suspended with the device 2 in the manhole 6 when the device is lowered into the same for use.

The center neck 36 is in fact truncated at the top, so that it has a bench 60 on the same at the forward end thereof, and a ramp 62 on the rearward end thereof. The ramp 62 is inclined to the bench 60, and there is an aperture 64 at the center of the bench 60 which opens into the top of the throat 28 therebelow. There are also part circumferential grooves 66 and 88 in the upper anterior quadrant of the end portions 4" and 4''', on that side of the device seen in FIG. 2, and the grooves 66 and 68 extend about the outer periphery of the end portions adjacent the neck 36, and open into the shoulders 38 and 40 of the portions through holes 70 and 72 overlying the bench 60 and ramp 62, respectively. The hole 72 over the ramp 62 is disposed in the vertical axial plane of the device, thereas the hole 70 over the bench 60 is angularly offset from the same to allow for the hole 52 for the valve stem 54, as seen in FIG. 1. Meanwhile, a pair of L-shaped shoes 74 and 76, having raised wing walls 74', 76', and apertures 78 and 80 in the upright end walls 74" and 76" thereof, is mounted on the bench and ramp, respectively, and abutted against the shoulders 38 and 40 thereadjacent, so that the apertures in the walls 74", 76" register with the holes 70 and 72 in the shoulders. The shoe 74 on the bench has a hole 82 in the bottom 74''' thereof, moreover, and the latter hole 82 registers with the aperture 64 in the bench, so that each of the respective holes 70, 72, and 64 opens into the annulus 42 through the shoes 74 and 76.

The part circumferential grooves 66 and 68 in the end portions 4", 4''' extend about the same to points approximating the horizontal plane coinciding with the bottom of the throat 28, and together with the holes 70, 78 and 72, 80, the grooves 66, 68 provide means whereby gas flow passages can be formed within the body of the device, to meter gas to the outer periphery of the same for purposes of determining the static pressure head in the liquid flow at the plane, relatively upstream and downstream of the throat 28. The respective pressure heads are used in turn to determine the depth of flow upstream and downstream of the throat, as explained more fully in the aforementioned co-pending Application. Meanwhile, the pressure head in the throat is also obtained, at 64, and together the three pressure heads enable the operator to determine the flow through the device, whether it is in the more normal direction from the upstream end 24 of the device to the opposing end 34 thereof, or in the reverse direction, from the end 34 to the end 24. Toward this end, flexible tubes 84 and 86 are inserted in the holes 78, 80 at the shoulders 38 and 40 of the device, and the tubes are roved about the outer periphery of the same in the grooves 66, 68, to points adjacent the bottoms of the grooves at which the ends of the tubes coincide with the plane at the bottom of the throat. In addition, the tubes 84 86 are secured within the respective grooves by means of a cementitious packing 88 which is terminated, however, short of the bottom ends 84', 86' of the tubes, to enable the metering gas to escape therefrom. The ends 84', 86' are mitered, moreover, to facilitate the escape of the gas from the grooves. In addition, a third more-rigid tube 90 is inserted in the holes 82, 64 at the center of the bench, and the bottom end 90' of this latter tube is positioned flush with the top of the throat 28, again to enable metering gas to escape from it into the throat. The upper end portions of the tubes 84, 86, 90 are retained, meanwhile, well outside of their respective sets of holes 70, 78, 72, 80 and 82, 64 and may even extend sufficient length therefrom to reach the top 6' of the manhole 6 when the device is lowered into the bottom of the same, as in FIG. 5. Given any lesser length, they are stubbed out at least sufficient length to mate with further tubes 92, 94, 96 of sufficiently greater length to reach the top 6' of the manhole when the latter tubes are connected with the stubbed-out ends of the same.

The device 2 is also equipped with a two-direction level 98 at the downstream end thereof, and the level 98 may be of such size as to be readily readable from the top 6' of the manhole 6 when the device is positioned in the bottom of the same and installed in the pipe, as shall be explained.

Figure 5:
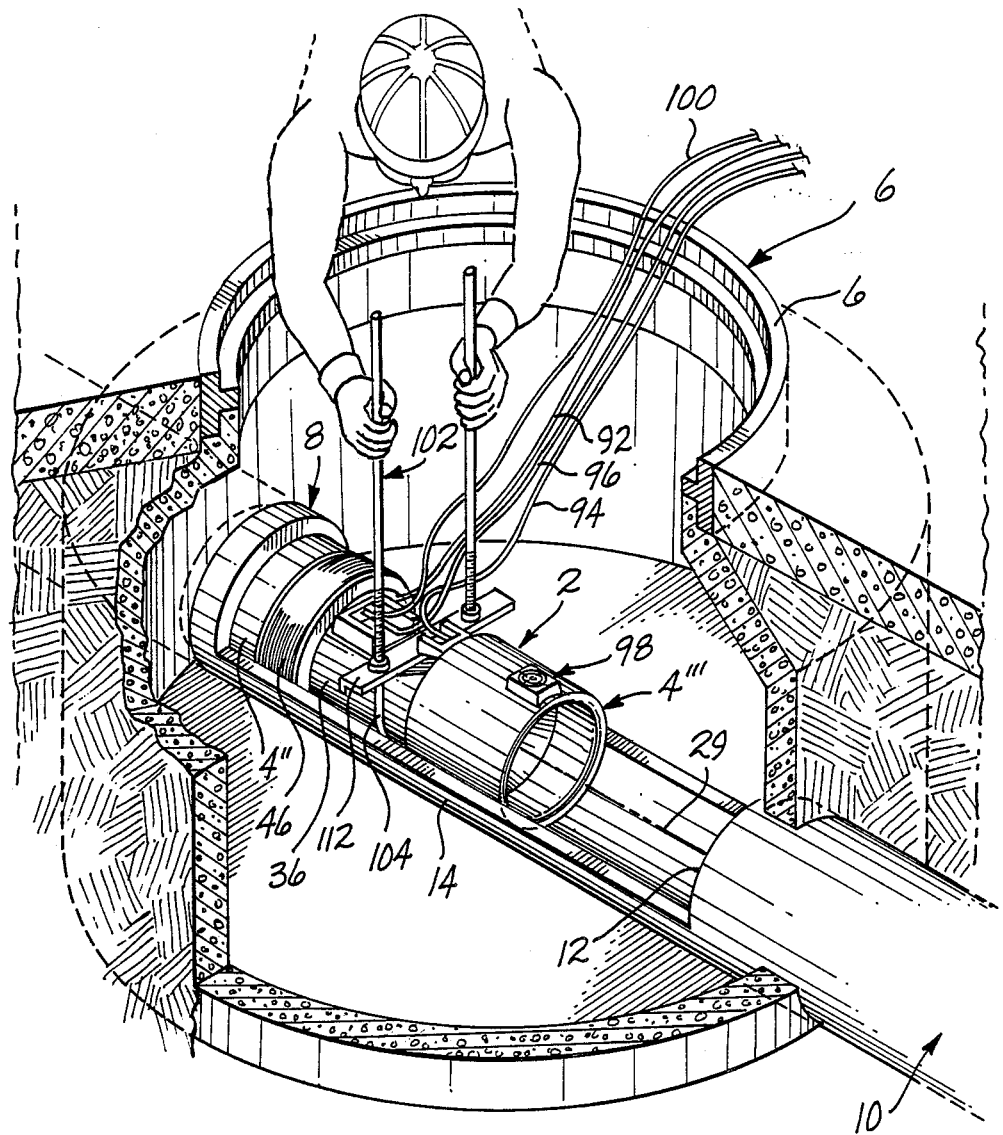
FIG. 5 is a part cut-away, part perspective view of a manhole, and sewer pipe with the device being installed in the upstream or entrance section of the pipe.

When the device 2 is put to use, three supply tubes 92, 94, 96 are mated with the stubbed-out ends of the feed tubes 84, 86, 90 on the device, as indicated, if the feed tubes do not have sufficient length to reach the top 6' of the manhole. In addition, a fourth tube 100 is mated with the valve stem 54 of the collar 46 in the hole 52, to enable compressed air or the like to be supplied to the collar for purpose of inflating it, as mentioned earlier. The device 2 is then shackled to a rigid stirrup 102 by which it can be suspended pendulum-like in the manhole 6 and positioned over the opening 12 of the pipe 10, for cradling in the undersection 14 of the same and then insertion in the upstream section 8 of the pipe, in the manner of FIG. 5. This may entail the operator resting chest-down on the ground about the manhole, as seen in FIG. 5 or standing above the manhole and positioning the device over and on the pipe from such a position. In any event, to effect the operation, the clevis 104 of a U-shaped shackle 106, with threaded elongated legs 108 on the same, is straddled about the neck 36 of the device at a point on the ramp 62 between the shoes 74 and 76, and the legs 108 are oriented about the device, generally perpendicular to the bench 60 at the top of the same, as seen in FIG. 1. Next, a pair of nuts 110 is screwed onto the legs to points below the level of the ramp; and an L-shaped cleat 112 with holes 114 spaced apart to mate with the legs 108 of the shackle, is lowered onto the body of the same until the cleat 112 abuts the ramp, as in FIG. 1. Following this, a second pair of nuts 116 is screwed onto the legs, and the two pairs of nuts 110 and 116 are adjusted to effectively clamp the shackle 106 to the device between the clevis 104 and the cleat 112. In this condition, the shackle becomes a rigid stirrup 102 by which the device 2 can be lowered, positioned and cradled on the pipe, and thereby leveled as will be explained, and then slidabley inserted in the upstream section 8 of the same in the manner of FIG. 2, the undersection 14 of the pipe serving, meanwhile, as a guide for the device as it is manipulated in the pipe. The operator then visually levels the device at 98, using the legs 108 of the shackle 106 as a means for rotating and/or raising or lowering the device until it is suitably telescoped within the pipe. The device is telescoped, moreover, to envelop the collar 46 within the upstream section 8 of the pipe, and this may be observed by the fact that the flange 48 disappears in the upstream section, or by the fact that it is plumb with the wall 6' of the manhole. Finally, when the device is suitably telescoped in the pipe, the collar 46 is inflated with compressed gas to form a liquid seal between the device and the pipe at the outer periphery of the device. The liquid in the pipe is constrained, as a result, to flow through the bore 16 of the device, either relatively toward the downstream end 34 thereof from the upstream end 24 thereof, or in the opposing direction should the pipe experience reverse flow through the manhole.

Figure 6:
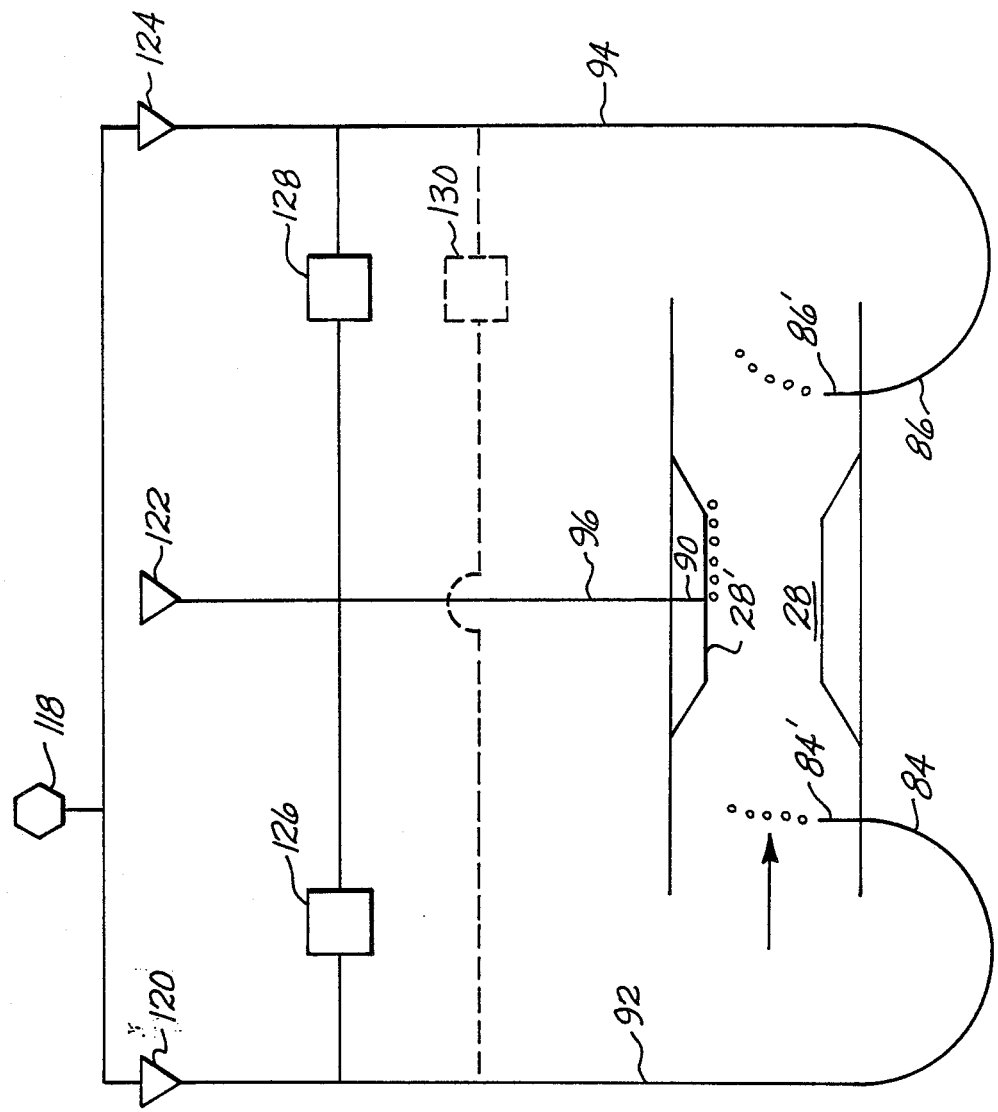
FIG. 6 is a highly schematic representation of the bubbler systems used to sense pressure heads in the device.

Ultimately, then the device is fully installed, the three supply tubes 92, 94 and 96 are collected in a bubbler-type signal converter (not shown), which is hung in turn on the wall 6' of the manhole and equipped with the instrumentation schematically represented in FIG. 6.

The static pressure head readings of tubes 84, 86 may be taken in the device, rather than outside thereof. In the embodiment of FIGS. 7-9, the body of the device 2' has ports 113 and 115 in the end portions 4", 4''' thereof, at the points where the tubes terminate. The ends 84', 86" of the tubes are inserted in the ports, as seen in FIGS. 8 and 9, and a pair of plugs 117 is inserted in the bottoms of the grooves 66, 68 to close the ports to the outer periphery of the end portions.

Referring now to FIG. 6, compressed gas source 18 is used to pressurize bubbler tubes 92, 94 and 96. The gas may be any nonflammable gas such as nitrogen or air. Compressed gas source 118 may be a cylinder of compressed gas or a compressor. The gas flows through pressure regulators 120, 122 and 124 which lower the pressure to the working pressures of bubbler tubes 92, 94 and 96. These pressure regulators also ensure that changes in pressure in one of the bubbler tubes do not affect the pressures in the other bubbler tubes. The pressure in each bubbler tube is thus determined by the depth of submergence of the open end of the tube (i.e., the static pressure head).

One end of bubbler tube 92 is connected to the pressure port of differential pressure gauge 126. Similarly, one end of bubbler tube 94 is connected to the reference port of differential pressure gauge 126. When the entrance section 8, and hence the throat 28, of the device are not filled with liquid, differential pressure gauge 126 senses the liquid level in the entrance section of the device. When the entrance section, and hence the throat, of the device are filled with liquid, differential pressure gauge 126 senses the difference between the pressures in bubbler tube 92 and that in bubbler tube 94. Differential pressure gauge 128 functions in a similar manner.

During open channel operation, with the flow direction as shown, the liquid level sensed by differential pressure gauge 126 is compared to the liquid level sensed by differential pressure gauge 128. Since the device is level, the open end of bubbler tubes 92 and 96 terminate at the same elevation. In the preferred embodiment, they both terminate at the same elevation as the elevation of the invert of the throat, but any elevation at or below that elevation is acceptable.

Figure 11:
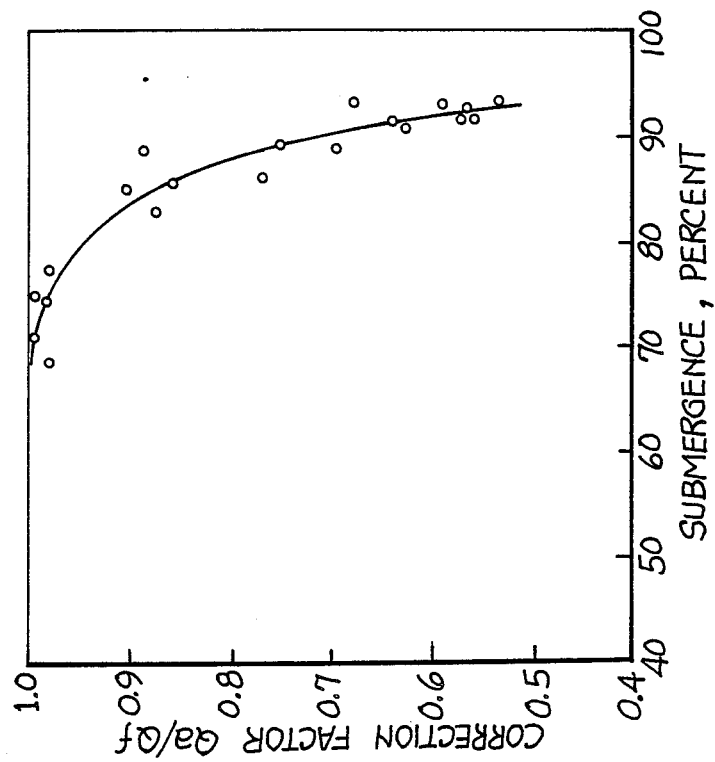
FIG. 11 is a typical correction curve that is used to correct the flow rate value indicated by reference to the open channel calibration curve when the device is operating above its modular limit.
Figure 10:
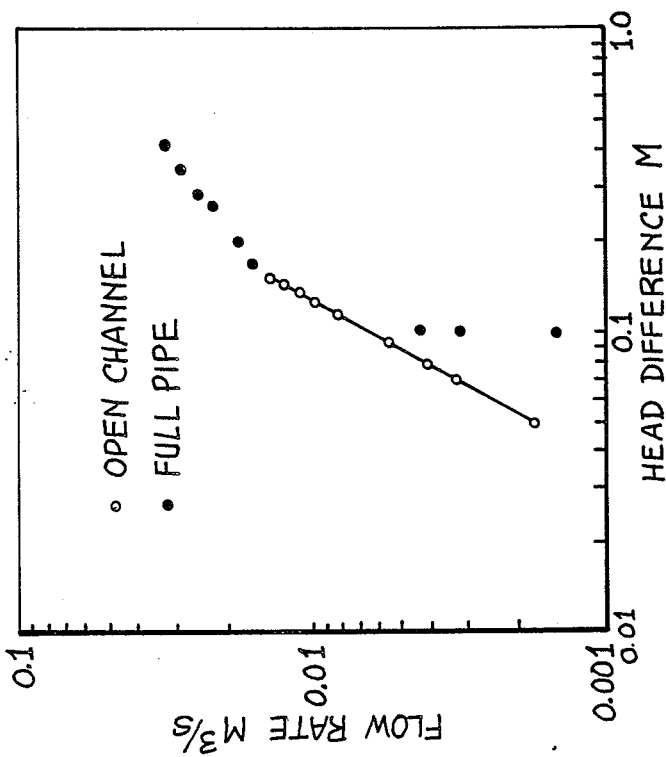
FIG. 10 is a typical calibration curve that is used to relate static pressure head differences to flow rate.

In conventional practice, the ratio of the downstream depth of flow to the upstream depth of flow (when expressed as a percentage) is termed the submergence. When the ratio exceeds a certain value, usually in the range 65-75 percent, a critical flow flume is said to be operating above its maximum submergence or above its modular limit. When such a meter operates below its modular limit, the device is said to be operating in a free flow mode. In a free flow mode, a unique relationship exists between the upstream depth of flow and the flow rate, if the meter is installed in a sewer of low to moderate slope, say up to about 2 percent slope. When such a meter operates above its modular limit, the device is said to be operating in a submerged mode. In a submerged mode, the flow rate predicted by a free flow calibration curve must be corrected by a factor that is a function of the percent submergence. Examples of a free flow calibration curve and a correction curve are presented in FIGS. 10 and 11, respectively. The flow rate obtained from FIG. 10 would be multiplied by the correction factor obtained from FIG. 11 to determine the corrected flow rate.

During open channel operation, with the flow direction opposite that shown, differential pressure gauge 128 is used to sense the "upstream" depth of flow and differential pressure gauge 126 is used to sense the "downstream" depth of flow. Similar calibration and correction curves would be used to relate pressure reading into flow rates. Thus the improved meter is capable of metering flow rates under the following conditions for both forward and reverse flow:

Open channel
    Free flow
    Submerged flow
Full Pipe

It should be apparent that, at positive sewer slopes appreciably greater than zero, reverse open channel flow will typically occur only momentarily, if at all. This is true because reverse flow is caused by a downstream increase in liquid depth. If the downstream increase in depth occurs slowly, the depth upstream will slowly increase until the increase stops or the sewer fills with liquid, but reverse open channel flow will not occur. If the downstream increase in depth occurs suddenly, then a surge will move upstream as a wave. Only during the passage of the wave might reverse open channel flow occur.

In an alternative embodiment, shown with dashed lines on FIG. 6, bubbler tube 92 is also connected to the pressure port of differential pressure gauge 130 and bubbler tube 96 is also connected to the reference port of differential pressure gauge 130. When the device is operating in an open channel mode, differential pressure gauge 130 is used to directly sense the difference between the pressures in the bubbler tubes, and, hence, the difference between the upstream and downstream liquid depths. This difference is compared to the upstream or downstream liquid depth to determine (1) the percent submergence and (2) the correct correction factor, if the meter is operating above its modular limit.

In the embodiment shown in FIGS. 1-5, the bubbler tubes 92 and 96 sense the static pressure head in the annular space between the inside wall of the sewer and the outside wall of the meter. The liquid in the annular space acts as a stilling well to attenuate variations in the sensed pressure. Furthermore, the open ends of the tubes are relatively isolated from the flowing liquid, and thus are less likely to be fouled by gross wastewater solids. Because the end of the annular space is open in the direction of flow, the static pressure head sensed by the tubes includes a very small component of velocity head equal to the head produced by stagnation of that portion of the velocity profile adjacent to the sewer walls as it impinges on the open end of the annular space. Even if the meter is installed in a sewer much larger than the meter outside diameter, the impact of incorporation of a small component of velocity head in the upstream and downstream head measurements does not significantly impact metering accuracy.

In the preferred embodiments of FIGS. 1–5 and 6–9, the entrance section 26, the exit section 30, the entrance transition 22 and the exit transition 32 have circular sections with their centers along the longitudinal axis 18 of the meter. The throat section 28 has a truncated circular section with a center along the same axis. The top 28' of the throat section is flat. In the preferred embodiments, the entrance transition 26 and exit transition 30 converge at a slope of 1:6. This transition slope is best because it causes the least head loss between the throat section and the downstream section and, hence, maximizes the modular limit (maximum submergence of the meter). This design maximizes the amount of submergence (due to tailwater) that can be accomodated by the meter before the modular limit is reached and before two depth measurements are required for metering of open channel flow.

Another improvement in meter design is that the throat section is adapted relative to the entrance section to cause simultaneous filling before the modular limit is reached when the meter is installed in sewers of minimum slope. In conventional practice, a sewer of minimum slope is one which flows full at an average velocity of 2 feet per second. Simultaneous filling occurs earlier (at lower normal depths) in sewers of greater slope providing an additional factor of safety against submerged operation.

In meters of similar design, the modular limit is a function solely of the size (inside diameter) of the meter. The modular limit of meters with nominal diameters of 8 to 12 inches typically ranges from 65 to 75 percent.

Given a particular sewer diameter, the normal depth of flow at a given flow rate can be determined using the well-known Manning formula:

$$Q = (1.486/n) \, AR^{2/3} S^{1/2}$$

where
Q = flow rate
n = coefficient of roughness (Manning's n)
A = area of flow (which is a function of normal depth of flow)
R = hydraulic radius (which is the area of flow divided by the wetted perimeter, both a function of the normal depth of flow)
S = sewer slope The above formula is usually solved by trial and error, substituting values for depth of flow into the formula until the sought after flow rate results.

To illustrate the application of the Manning formula, assume the following:
Sewer diameter—8 inches (0.667 ft)
Sewer slope—0.0033 ft/ft
Manning's n—0.013

By trial and error, wastewater flowing at a rate of 0.525 cubic feet per second (cfs) will flow at a normal depth of 0.433 ft (5.2 inches).

As was noted above, both the upstream ad downstream depths of flow are measured by this invention relative to the elevation of the bottom of the throat. The Manning formula, on the other hand, predicts the downstream normal depth of flow relative to the invert elevation of the sewer. With a device with an entrance inside diameter of 6.9 inches and a throat inside diameter of 5.5 inches installed in an 8-inch sewer, the throat invert elevation would be about 1.25 inches (0.104 feet) above the sewer invert, with a relatively low sewer slope. Thus, a downstream normal depth of 0.433 ft would cause a downstream depth reading of 0.433−0.104=0.329 feet=3.95 inches to be registered by the meter.

The equations presented in U.S. Pat. Application No. 051,325 could be used to show that a meter with an entrance section with a 6.9 inch inside diameter and a throat with a centered 5.5 inch inside diameter and a 4.5 inch height would cause simultaneous entrance section and throat section filling at a flow rate of 0.525 cfs. That is, at a flow rate of 0.525 cfs, under free flow conditions, the upstream depth (measured relative to the throat invert elevation) would be 6.9−0.7=6.2 inches, because the throat invert elevation in this design is 0.7 inches above the entrance invert elevation.

With this meter installed in an 8-inch sewer, the ratio of the downstream depth reading (3.95 inches) to the upstream depth reading (6.2 inches) would be 0.64 or 64 percent. With an exit transition of 1:6, the meter would have a modular limit of about 65 percent. Thus, with this design, the throat section and upstream section of the meter would simultaneously fill before the modular limit was reached, if the sewer downstream from the meter were flowing at the normal depth predicted by the Manning formula. This is important because one can be assured that submerged operation will not occur during normal operation of the meter. Metering under open channel conditions in an unsubmerged mode as well as metering under full pipe conditions requires obtaining and manipulating only a single differential pressure reading. On the other hand, metering under open channel conditions in a submerged mode requires obtaining and manipulating two differential pressure readings and, for this reason, is inherently less accurate. Adapting the throat of the meter to cause simultaneous throat and entrance filling at a flow rate below the modular limit is thus a significant improvement in meter design.

A portable wastewater flow metering device has been disclosed for installation in the entrance pipe to a sewer manhole. The device is capable of measuring liquid flow both under free flow, open channel conditions and under full pipe conditions by taking measurements in a sewer adjacent to one sewer manhole.

The invention is not to be construed as limited to the particular forms disclosed herein, since these are to be regarded as illustrative rather then restrictive. It is the intention of this patent to cover all changes and modifications of the example of the invention herein chosen for the purposes of the disclosure, which do not constitute departures from the spirit and scope of the invention.

I claim:

1. In the process of metering the flow of liquid which is flowing by gravity in an elongated pipe that is open to atmosphere, wherein:
   tubular venturi metering device is installed in the pipe, which has an open-ended bore therethrough having an axis extending end-to-end thereof,
   arranging the device in the pipe so that the axis of the bore is disposed substantially parallel to the longitudinal axis of the pipe and the bore thus has an end which is normally oriented upstream of the liquid flow in the pipe and an end which is normally oriented downstream of the liquid flow in the pipe, the bore having an axially inwardly tapered entrance section adjacent the upstream end thereof which converges toward the axis of the bore in vertical planes paralleling the axis of the bore relatively toward the downstream end of the bore but terminates short of the axis of the bore so that a throat is formed in the bore which opens to the downstream end thereof, forming a liquid seal between the device and the pipe at the outer periphery of the device so that the liquid in that section of the pipe disposed upstream from the upstream end of the bore of the device, is constrained to flow through the bore of the device, relatively toward the downstream end thereof, determining the static pressure head in the liquid in the aforesaid upstream section of the pipe when the liquid is flowing in the pipe at a depth less than that adapted to fill the upstream pipe, to meter the flow in the pipe for the less than full condition thereof, configuring the cross-sectional area of the throat, relative to that of the pipe, transverse the respective axes thereof, so that the throat will fill with liquid substantially simultaneously with the upstream section of the pipe, when the liquid depth rises therein, and providing means whereby the static pressure head of the liquid in the throat of the device and the upstream section of the pipe can be determined when both the upstream section of the pipe and the throat are filled, so that the difference between the latter two pressure heads can be determined to meter the flow in the pipe for the full condition thereof, and thereby enable the flow in the pipe to be metered for the full condition thereof as well as the less than full condition thereof and the transition therebetween, the improvement wherein:

arranging the device in the pipe with its axis and the top of its throat horizontal thus leveling the device, the bore having an axially outwardly tapered exit section adjacent the downstream end thereof which diverges from the axis of the bore in vertical planes paralleling the axis of the bore relatively toward the end of the bore that is normally downstream, providing means whereby the static pressure head of the liquid in the throat of the device and in both the entrance section and the exit section can be determined, so that the difference between the static pressure heads in the entrance section and in the exit section can be used to determine the direction of flow and, hence, the actual upstream end of the device, and, during the less than full condition, an appropriate correction factor for metering the flow rate, and so that the difference between the throat pressure head and the actual upstream pressure head can be determined to meter the flow in the pipe for the full condition thereof.

2. The process in claim 1 wherein the cross-sectional area of the throat is configured relative to the entrance section of the bore and the exit section of the bore to cause simultaneous filling of the throat and the section of the bore that is actually upstream before the modular limit of the device is reached when the device is installed in a pipe of minimum slope.

3. In the combination wherein there are:

an elongated pipe which is open to atmosphere and adapted for the flow of liquid by gravity therein, a tubular venturi metering device installed in the pipe and having an open-ended bore therethrough which has an axis extending end-to-end thereof, the device being arranged in the pipe so that the axis of the bore is disposed substantially parallel to the longitudinal axis of the pipe and the bore thus has an end which is normally oriented upstream of the liquid flow of the pipe and an end which is normally oriented downstream of the liquid flow in the pipe, the bore having an axially inwardly tapered entrance section adjacent the upstream end thereof, which converges toward the axis of the bore in vertical planes paralleling the axis of the bore and in that axial direction of the bore relatively toward the downstream end of the bore, but terminates short of the axis of the bore so that a throat is formed in the bore which opens to the downstream end thereof, means for forming a liquid seal between the device and the pipe at the outer periphery of the device so that the liquid in that section of the pipe disposed upstream from the upstream end of the bore of the device, is constrained to flow through the bore of the device, relatively toward the downstream end thereof, and first means for determining the static pressure head of the liquid in the aforesaid upstream section of the pipe when the liquid is flowing in the pipe at a depth less than that adapted to fill the upstream section of the pipe, to meter the flow in the pipe for the less than full condition thereof, the cross-sectional area of the throat being configured relative to that of the upstream section of the pipe, transverse the respective axes thereof, so that the throat will fill with liquid substantially simultaneously with the upstream section of the pipe, when the liquid rises therein, and there being second means for determining static pressure head of the liquid in the throat of the device and in the upstream section of the pipe when both the upstream section of the pipe and the throat are filled, so that the difference between the latter two pressure heads can be determined to meter the flow in the pipe for the full condition thereof, and thereby enable the flow in the pipe to be metered for the full condition thereof, as well as the less than full condition thereof and the transition therebetween, the improvement comprising means for leveling the device, an axially outwardly tapered exit section adjacent the downstream end of the bore which diverges from the axis of the bore in vertical planes paralleling the axis of the bore relatively toward the end of the bore that is normally downstream, means for determining the static pressure head of the liquid in the throat of the device and both in the entrance section and in the exit section whereby the difference between the static pressure heads in the entrance section and the exit section can be used to determine the direction of flow and, hence, the actual upstream end of the device, and during the less than full condition an appropriate correction factor for metering flow rate and whereby the difference between the throat pressure head and the actual upstream pressure head can be determined to meter the flow in the pipe for the full condition thereof.

4. The combination in claim 3 wherein the cross-sectional area of the throat is configured relative to the entrance section of the bore and the exit section of the bore to cause simultaneous filling of the throat and the section of the bore that is actually upstream before the modular limit of the device is reached when the device is installed in a pipe of minimum slope.

5. The combination in claim 4 wherein means for determining the static pressure head of the liquid in the entrance section and in the exit section comprise tubes that discharge bubbles into the liquid in the annular space between the outside surface of the device and the inside surface of the pipe.

6. The combination in claim 4 wherein means for determining the static pressure head of the liquid in the entrance section and in the exit section comprise tubes that discharge bubbles into the liquid as it flows through the interior of the device.

* * * * *